(12) United States Patent
Murakami

(10) Patent No.: US 7,621,383 B2
(45) Date of Patent: Nov. 24, 2009

(54) DOUBLE TUBE HYDRAULIC SHOCK ABSORBER

(75) Inventor: Tomoharu Murakami, Minato-ku (JP)

(73) Assignee: Kayaba Industry Co., Ltd., Tokyo (JP)

( * ) Notice: Subject to any disclaimer, the term of this patent is extended or adjusted under 35 U.S.C. 154(b) by 222 days.

(21) Appl. No.: 11/384,382

(22) Filed: Mar. 21, 2006

(65) Prior Publication Data
US 2006/0213734 A1    Sep. 28, 2006

(30) Foreign Application Priority Data
Mar. 28, 2005    (JP)    ............................... 2005-90480

(51) Int. Cl.
*F16F 9/34*    (2006.01)
(52) U.S. Cl. ................... 188/322.14; 188/313; 188/315
(58) Field of Classification Search ............ 188/322.13, 188/322.14, 322.16, 322.17, 315, 313, 314; 280/668
See application file for complete search history.

(56) References Cited

U.S. PATENT DOCUMENTS

| | | | | |
|---|---|---|---|---|
| 2,726,737 A | * | 12/1955 | Chisholm, Jr. | 188/322.14 |
| 3,874,487 A | * | 4/1975 | Keijzer et al. | 188/322.14 |
| 4,401,196 A | * | 8/1983 | Grundei | 188/322.14 |
| 4,782,925 A | * | 11/1988 | Grundei | 188/315 |
| 5,219,414 A | * | 6/1993 | Yamaoka | 188/322.14 |
| 5,638,927 A | * | 6/1997 | Cheatham et al. | 188/322.14 |
| 6,622,832 B2 | * | 9/2003 | Ashiba et al. | 188/322.13 |
| 6,684,990 B2 | * | 2/2004 | Takakusaki | 188/322.14 |

FOREIGN PATENT DOCUMENTS

| | | |
|---|---|---|
| CN | 1216092 A | 5/1999 |
| CN | 2385144 Y | 6/2000 |
| JP | 11-201211 | 7/1999 |

* cited by examiner

*Primary Examiner*—Thomas J Williams
(74) *Attorney, Agent, or Firm*—Rabin & Berdo, P.C.

(57) ABSTRACT

A double tube hydraulic shock absorber comprises: an outer tube; an inner tube; a base valve which is fitted and fixed to a base end of the inner tube; a lower cap provided so as to contact a leg portion of the base valve and seal a base end of the outer tube in an oil tight fashion; a piston rod inserted into the inner tube so as to be capable of an axial reciprocation; and a guide member attached to a top side of the outer tube and the inner tube so as to support the piston rod and apply an axial force on the inner tube. In this double tube hydraulic shock absorber, the leg portion of the base valve and the lower cap contact each other on a line of action of the axial force that is applied toward the base end of the inner tube.

13 Claims, 3 Drawing Sheets

DOUBLE TUBE HYDRAULIC SHOCK ABSORBER

FIELD OF THE INVENTION

This invention relates to a double tube hydraulic shock absorber used in a suspension device of an automobile, an industrial vehicle, or similar, and more particularly to an attachment structure for a base valve which is fixed into position on a lower cap when attached to a base end of an inner tube.

BACKGROUND OF THE INVENTION

JP11-201211A, published by the Japan Patent Office in 1999, discloses an attachment structure for a base valve which is fixed into position on a lower cap of a double tube hydraulic shock absorber. As shown in FIG. 3, a lower cap 34 is fitted into a base end of an outer tube 32 and welded thereto at its outer periphery such that the base end of the outer tube 32 is blocked in an oil tight fashion. A base valve 35, which is fitted and fixed to a base end of an inner tube 33, is fixed into position on an upper surface of the lower cap 34.

The base valve 35 comprises a valve case 36, a non-return valve 37, a pressure side damping force-generating valve 38, and a fixing pin 39. The valve case 36 comprises a pressure side port 36a and an expansion side port 36b. The non-return valve 37 is disposed on an upper surface of the valve case 36 so as to cover the expansion side port 36b openably. The pressure side damping force-generating valve 38 is disposed on a lower surface of the valve case 36 so as to cover the pressure side port 36a openably. The fixing pin 39 fixes the non-return valve 37 and pressure side damping force-generating valve 38 to the valve case 36 by means of pressure.

A plurality of leg portions 40 contacting the upper surface of the lower cap 34 are formed on a lower surface outer peripheral portion of the valve case 36 so as to protrude at predetermined intervals on the circumference. Oil passages are provided between adjacent leg portions 40, and these oil passages communicate with a reservoir chamber 42 formed between the inner tube 33 and outer tube 32.

During a compression operation of the double tube hydraulic shock absorber, a piston rod 41 penetrates the inner tube 33, creating surplus operating fluid in an amount corresponding to the volume of the penetrating rod. This surplus operating fluid is delivered to the reservoir chamber 42 via the pressure side port 36a, the pressure side damping force-generating valve 38, and the aforementioned oil passages, and thus a predetermined pressure side damping force is generated by the pressure side damping force-generating valve 38.

SUMMARY OF THE INVENTION

In the double tube hydraulic shock absorber constituted as described above, a bearing member for supporting the piston rod is provided at a top side of the outer tube 32 and inner tube 33. The bearing member is typically attached to the top side by welding or caulking. With this technique, when the bearing member is fixed into position, a predetermined axial force acts on the inner tube 33 toward the lower cap 34. The leg portions 40 on the lower surface outer peripheral portion of the valve case 36 are provided further inside than a line of extension of the inner tube 33 at an opening end thereof, and hence when excessive axial force is applied, the valve case 36 may buckle into an upward-facing convex shape.

This is due to the fact that the contact sites between the leg portions 40 and lower cap 34 are further inside than the sites on which this axial force acts, more specifically, a base portion 37d of a stepped portion 37c provided on an upper surface outer peripheral end of the valve case 36, which is contacted by the opening end of the inner tube 33. Therefore, a bending moment which causes the valve case 36 to buckle is generated by differences in the application point of the force. When the valve case 36 buckles, the non-return valve 37 and pressure side damping force-generating valve 38 disposed on the valve case 36 deviate from their predetermined positions, and as a result, it may be impossible to generate a desired pressure side damping force.

In recent years, the inner tube 33, valve case 36, and so on have been set at a minimum thickness in order to reduce the weight of the double tube hydraulic shock absorber, and as a result the valve case 36 has become more likely to buckle.

To ensure that excessive axial force such as that described above is not applied, a delicate operation is required to attach the bearing member, leading to increases in working hours and manufacturing costs.

It is therefore an object of this invention to prevent a base valve of a double tube hydraulic shock absorber from buckling when the base valve is mounted on a lower cap, without increasing the plate thickness and without the need for a delicate operation.

In order to achieve the above object, this invention provides a double tube hydraulic shock absorber, the double tube hydraulic shock absorber comprises an outer tube, an inner tube provided in an interior of, and concentrically with, the outer tube, a base valve having a leg portion on a base end side thereof, which is fitted and fixed to a base end of the inner tube, a lower cap provided so as to contact the leg portion and seal a base end of the outer tube in an oil tight fashion, a piston rod inserted into the inner tube so as to be capable of an axial reciprocation, and a guide member attached to a top side of the outer tube and the inner tube so as to support the piston rod and apply an axial force on the inner tube toward the base end of the inner tube, wherein the leg portion of the base valve and the lower cap contact each other on a line of action of the axial force that is applied toward the base end of the inner tube.

The details as well as other features and advantages of this invention are set forth in the remainder of the specification and are shown in the accompanying drawings.

DESCRIPTION OF THE PREFERRED EMBODIMENTS

Figure 1:
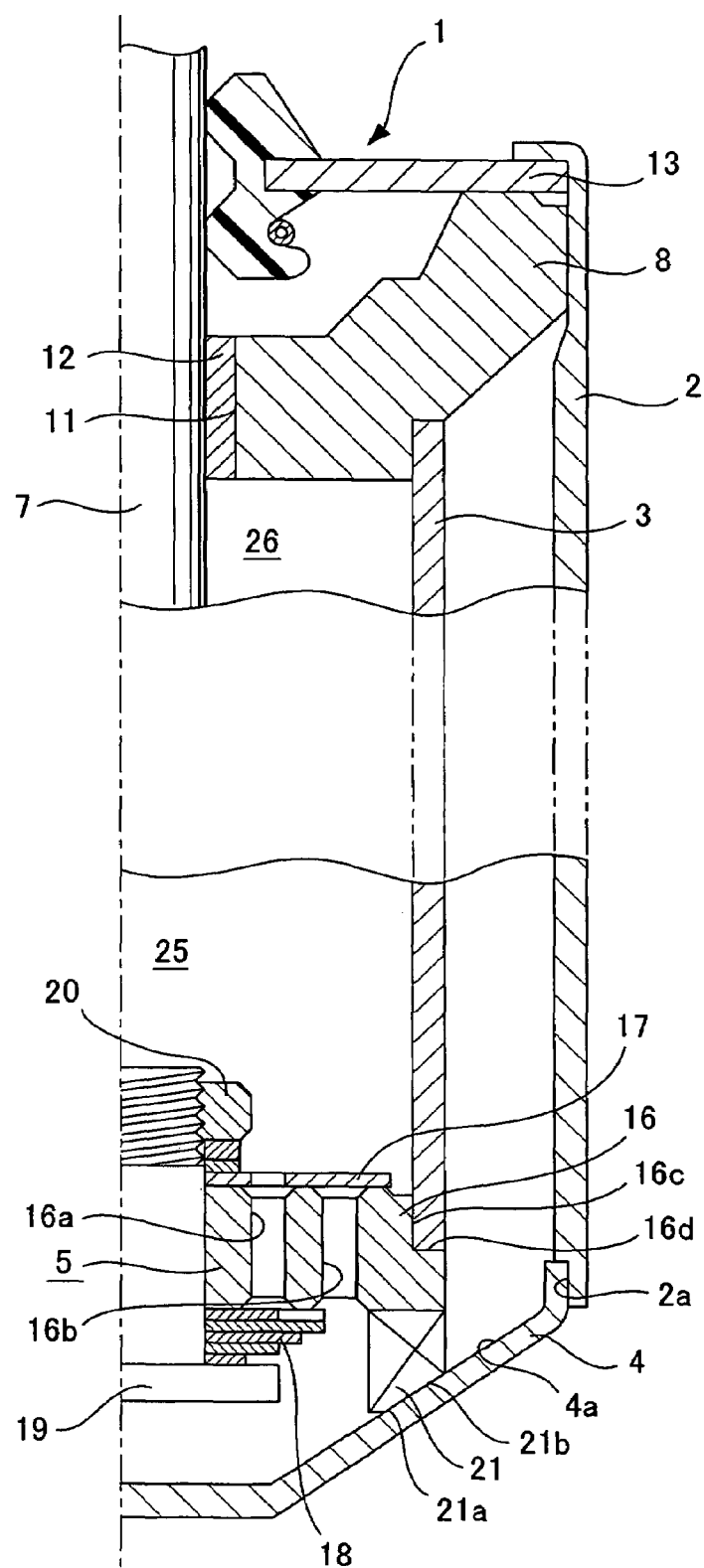
FIG. 1 is a partially fractured front view showing a double tube hydraulic shock absorber of an embodiment on the right hand side of a center line.

A double tube hydraulic shock absorber according to an embodiment of this invention will now be described. As shown in FIG. 1, a double tube hydraulic shock absorber 1 comprises an outer tube 2, an inner tube 3, a lower cap 4, a base valve 5, a piston rod 7, and a rod guide 8. The outer tube 2 and inner tube 3 are disposed concentrically. The lower cap 4 is attached to a base end of the outer tube 2. The base valve 5 is fitted and fixed to a base end of the inner tube 3, and fixed into position on an upper surface of the lower cap 4. The piston rod 7 is inserted into the inner tube 3 so as to be free to protrude and retract. The rod guide 8 seals a top side of the inner tube 3 and outer tube 2, and supports the piston rod 7 slidably.

The rod guide 8 is fitted so as to extend from an inner periphery on the top side of the outer tube 2 to an inner periphery on the top side of the inner tube 3. A guiding hole 11 for guiding the piston rod 7 is provided in the center of the rod guide 8, and the piston rod 7 is supported slidably by the rod guide 8 via an annular bearing member 12 fitted into the guiding hole 11.

A sealing member 13 is disposed on an upper surface of the rod guide 8 to seal a gap with the piston rod 7, and by bending and caulking a top end portion of the outer tube 2 inward, the rod guide 8 and sealing member 13 are fixed to the outer tube 2 and inner tube 3.

Figure 2:
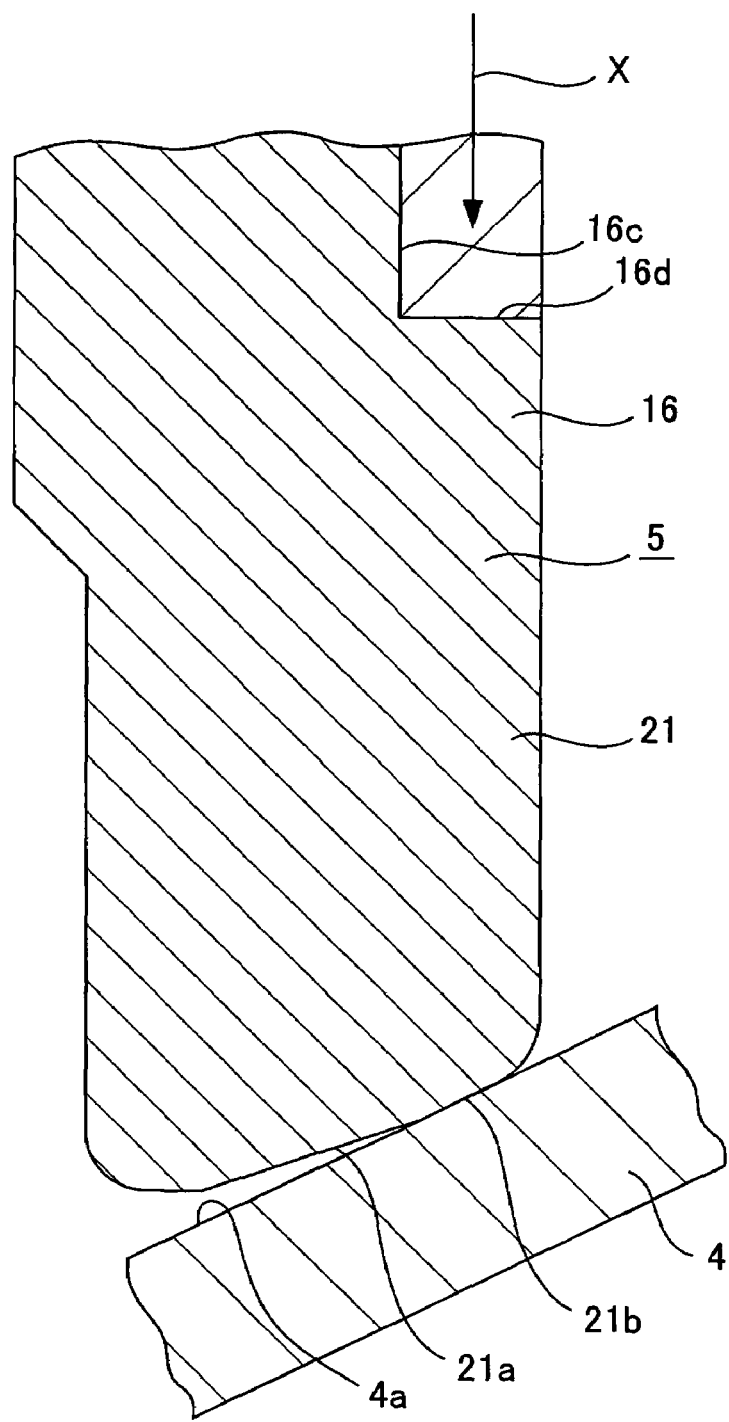
FIG. 2 is an enlarged sectional view showing a state of contact between leg portions of a base valve and a lower cap shown in FIG. 1.
Figure 3:
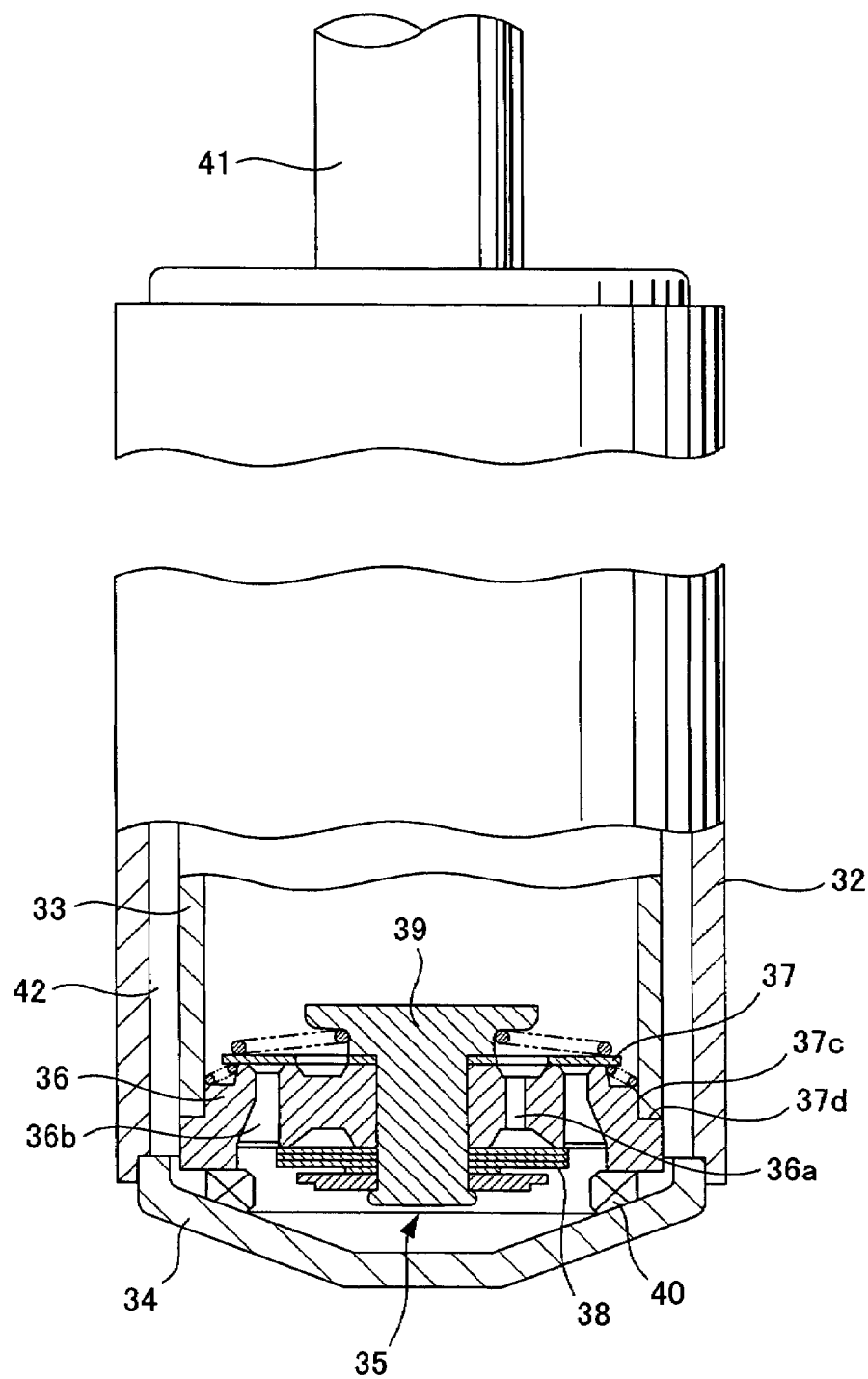
FIG. 3 is a partially fractured front view showing a conventional example of a double tube hydraulic shock absorber.

Thus, an axial force indicated by an arrow X in FIG. 2 acts on the base valve 5 in the direction of the lower cap 4 via the rod guide 8 and inner tube 3.

A piston is inserted into the base end portion of the piston rod 7 and fixed by a nut, thereby dividing the interior of the inner tube 3 into a rod chamber 26 and a piston chamber 25.

The lower cap 4 is fitted into a tube side stepped portion 2a provided at the base end of the outer tube 2, and by welding the outer periphery of a boundary portion between the lower cap 4 and outer tube 2, the base end of the outer tube 2 is sealed in an oil tight fashion.

The base valve 5 comprises a valve case 16, a non-return valve 17, a pressure side damping force-generating valve 18, a fixing bolt 19, and a nut 20. The valve case 16 comprises a pressure side port 16a and an expansion side port 16b. The non-return valve 17 is disposed on an upper surface of the valve case 16 so as to cover the expansion side port 16b openably. The pressure side damping force-generating valve 18 is disposed on a lower surface of the valve case 16 so as to cover the pressure side port 16a openably. The fixing bolt 19 and nut 20 fix the non-return valve 17 and pressure side damping force-generating valve 18 to the valve case 16 by means of pressure.

An upper surface outer peripheral end of the valve case 16, which is further outward than the non-return valve 17, is provided with a stepped portion 16c into which the base end of the inner tube 3 is fitted. A plurality of leg portions 21 contacting the upper surface of the lower cap 4 are formed on a lower surface outer peripheral end of the valve case 16, which is further outward than the pressure side damping force-generating valve 18, so as to protrude at predetermined intervals on the circumference.

An inclined surface 21a is formed on a lower surface of the leg portions 21 in alignment with an inclined portion 4a on the upper surface of the lower cap 4. As shown in FIG. 2, a contact portion 21b is formed on a part of the inclined surface 21a which is directly under a base portion 16d of the stepped portion 16c contacted by the base end of the inner tube 3, and only the contact portion 21b contacts the lower cap side inclined surface 4a.

The angle of the inclined surface 21a apart from the contact portion 21b is set such that a gap can be formed between the inclined surfaces 4a, 21a. The angle of the inclined surface 21a may be set differently to the angle of the inclined surface 4a, or a gap between the inclined surface 21a and the inclined surface 4a may be set to be a steadily larger toward the inside.

Hence, the base portion 16d at which the base end of the inner tube 3 contacts the valve case 16 and the contact portion 21b at which the leg portions 21 contact the lower cap 4 are located on the line of action of the axial force X, and therefore, when the axial force X is applied to the valve case 16 via the inner tube 3, the occurrence of a bending moment which causes the valve case 16 to buckle can be prevented.

As described above, the base valve 5 of the hydraulic shock absorber 1 is constituted such that the axial force X applied to the base portion 16d of the valve case 16 via the inner tube 3 during attachment of the rod guide 8 is transmitted to the lower cap 4 via the contact portion 21b of the leg portions 21 which is directly under the base portion 16d, and therefore both the base portion 16d and the contact portion 21b can be disposed on the line of action of the axial force X. Thus the valve case 16 can be prevented from buckling when a bending moment is generated in the valve case 16.

The non-return valve 17 and pressure side damping force-generating valve 18 disposed on the valve case 16 can be prevented from deviating from their predetermined positions due to buckling of the valve case 16, and therefore a desired pressure side damping force can be generated.

Even when the axial force X is applied to the inner tube 3 during attachment of the rod guide 8, the valve case 16 does not buckle, and as a result the attachment process can be simplified, the time required for the attachment operation can be reduced, and the manufacturing cost can also be reduced.

What is claimed is:

1. A double tube hydraulic shock absorber comprising:
    an outer tube;
    an inner tube provided in an interior of, and concentrically with, the outer tube;
    a base valve having a leg portion on a base end side thereof, the base valve being fitted and fixed to a base end of the inner tube;
    a lower cap provided so as to contact the leg portion and seal a base end of the outer tube in an oil tight fashion;
    a piston rod inserted into the inner tube so as to be capable of an axial reciprocation; and
    a guide member attached to a top side of the outer tube and the inner tube so as to support the piston rod and apply an axial force on the inner tube toward the base end of the inner tube,
    wherein:
    the leg portion has an inclined portion on its lower surface, and the lower cap has an inclined portion on its upper surface; and
    the inclined portion of the leg portion includes a contact portion and a remaining portion, the contact portion is formed directly under the base end of the inner tube in an axial direction of the inner tube and does not extend beyond an area directly under the base end of the inner tube, and the contact portion only contacts the inclined portion of the lower cap, while the remaining portion is spaced apart from the inclined portion of the lower cap with a gap being formed therebetween.

2. The double tube hydraulic shock absorber as defined in claim 1, wherein the leg portion is provided on an opposite side of the base valve to a part thereof at which the base end of the inner tube contacts the base valve.

3. The double tube hydraulic shock absorber as defined in claim 1, wherein the guide member is fixed to the top side of the outer tube and the inner tube by caulking.

4. The double tube hydraulic shock absorber as defined in claim 1, wherein:
    the base valve includes a base portion that contacts the base end of the inner tube in the axial direction of the inner tube; and
    the contact portion of the leg portion is a part of the inclined portion that is directly under the base portion.

5. The double tube hydraulic shock absorber as defined in claim 4, wherein the base portion of the base valve and the contact portion of the leg portion are located on a line of action of an axial force applied to the inner tube.

6. The double tube hydraulic shock absorber as defined in claim 1, wherein:

the base valve includes a stepped portion into which the base end of the inner tube is fitted;

the stepped portion includes a base portion that contacts the base end of the inner tube in the axial direction of the inner tube; and the contact portion of the leg portion is a part of the inclined portion that is directly under the base portion of the stepped portion.

7. The double tube hydraulic shock absorber as defined in claim 6, wherein the base portion of the base valve and the contact portion of the leg portion are located on a line of action of an axial force applied to the inner tube.

8. The double tube hydraulic shock absorber as defined in claim 1, wherein the gap is set to be steadily larger toward an inside of the shock absorber.

9. The double tube hydraulic shock absorber as defined in claim 1, wherein the contact portion includes at least a portion that is disposed inner than an outermost end of the inclined portion.

10. The double tube hydraulic shock absorber as defined in claim 1, wherein the inclined surface of the lower surface of the leg portion is inclined in a downward fashion as the lower surface of the leg portion extends radially inward.

11. The double tube hydraulic shock absorber as defined in claim 1, wherein:

the leg portion includes an outer side surface and an inner side surface, both of which extend in a direction parallel to the axial direction of the inner tube; and the inclined portion of the leg portion bridges the outer side surface and the inner side surface, and is inclined in a downward fashion as the inclined portion of the leg portion extends from the outer side surface to the inner side surface.

12. The double tube hydraulic shock absorber as defined in claim 1, wherein the leg portion protrudes from a remaining portion of the base valve in the axial direction of the inner tube, such that an interval is formed in a radial direction of the inner tube between an inner side wall of the leg portion and a corresponding portion of the base valve that directly faces the inner side wall of the leg portion in the radial direction of the inner tube.

13. The double tube hydraulic shock absorber as defined in claim 1, wherein the base valve includes a valve case having an upper surface and a lower surface, a part of the upper surface being in contact with the base end of the inner tube, the leg portion protruding from the lower surface of the valve case in the axial direction of the inner tube, such that:

the leg portion further includes, in addition to the lower surface, an inner side surface and an outer side surface;

the inner side surface is disposed radially inner than the outer side surface;

the lower surface connects the inner side surface and the outer side surface; and the inner side surface directly faces a corresponding portion of the base valve and is radially spaced apart from the corresponding portion of the base valve.

\* \* \* \* \*